J. G. WALLMANN.
ELECTRIC WATER HEATING APPARATUS.
APPLICATION FILED AUG. 25, 1910.
1,004,608.
Patented Oct. 3, 1911.
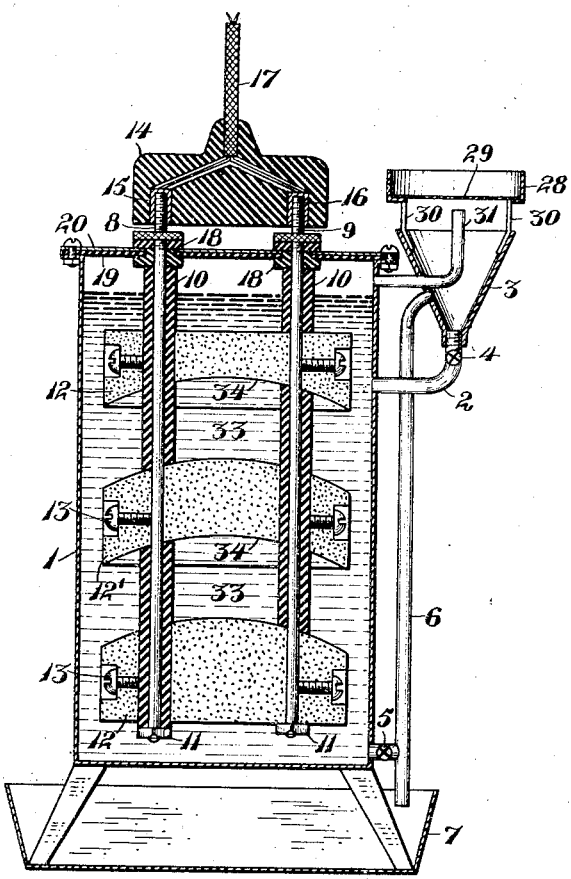
WITNESSES:
F. C. Fliedner
Chas. P. Sonntag
INVENTOR
Johann G. Wallmann
BY
Lincoln Sonntag
ATTORNEY

UNITED STATES PATENT OFFICE.

JOHANN G. WALLMANN, OF OAKLAND, CALIFORNIA.

ELECTRIC WATER-HEATING APPARATUS.

1,004,608.  Specification of Letters Patent.  Patented Oct. 3, 1911.

Application filed August 25, 1910. Serial No. 578,978.

*To all whom it may concern:*

Be it known that I, JOHANN G. WALL-MANN, a citizen of the United States, residing at the city of Oakland, in the county of Alameda and State of California, have invented certain new and useful Improvements in Electric Water-Heating Apparatus, of which the following is a specification.

My invention relates to electric water heating apparatus.

The object of my invention is particularly to provide electric apparatus whereby steam may be rapidly generated for the taking of a steam bath, the steam to be retained in a cabinet constructed for such purpose and which is at all times during the taking of the bath under the control of the person in the cabinet, and also whereby a steam bath may be taken at any temperature desired but the apparatus may be used for heating water for purposes other than that mentioned.

My invention consists in the combination and arrangements of parts shown in the accompanying drawing, described in the following specification and claimed in the appended claims.

Referring to the accompanying drawings Figure 1 is a view of the electric steam generating apparatus as contained and supported in a boiler, certain parts thereof hereinafter described being shown in section.

In the figures 1 shows a boiler to contain water for the generation of steam.

2 represents a pipe emptying into the boiler and 3 a funnel for pouring water therein to escape into the boiler. 4 represents a valve located in said pipe. 5 is a valve to be used in emptying the boiler.

6 shows a waste pipe and 7 a drip pan beneath the same.

Current enters the carbon disks 12 by means of a conducting rod 9 to carbon disk 12' by means of conducting rod 8, both rods being insulated from each other and from plate 20 by means of porcelain washers 18. The disks are insulated from each other by means of porcelain tubes 10. Screws 13 hold the disks firmly in place. Nuts 11 also assist in keeping the disks in place. The current entering by way of rod 8 passes by way of the same to electrode 12', and then passes across the spaces designated 33. The water in said spaces when the boiler is filled acts as a resistance between electrodes 12 connected to rod 9 and electrode 12' connected to rod 8. The water being used as a resistance consequently is heated and the steam generated passes off by way of spout 31. A sulfur or other mineral bath may be taken with the apparatus by placing the mineral in the removable pan 28 with a screen 29 at its bottom, said pan being held in place by legs 30 of funnel 3. The pan has a gauze bottom so that the steam may penetrate the sulfur or other mineral contained in the pan, the condensed steam descending into the funnel and being conducted to the drip pan 7 by means of pipe 6.

Upper disk 12 and intermediate disk 12' are concave or dome-shaped as shown at 34 so as to regulate the current consumption in using water of different conductivity, pure water being of greater resistance than water containing salts. When the current is turned on, if the water contains mineral substances, the consumption of current for the time being will be great owing to the reduced resistance of the fluid. To overcome such consumption of current by reason of the great conductivity of the water the concave or dome-shaped portions of the disks are designed to become filled with steam, forcing out the water and exposing less surface of carbon in space designated 33, consequently cutting down the amperage; and the apparatus will in this way automatically regulate itself to the different waters used. The steam in condensing allows more surface of the carbon disks at the points designated 34 to be engaged and steam forming again as explained, the operation regulates itself, the current being of low amperage rather than one of high amperage; in this way the apparatus becomes practical for use in a lighting circuit in a house and eliminates the necessity of running a special circuit should it be desired to use it for such purpose in addition to the main object thereof.

As part of the construction, 19 designates a rubber gasket and 14 a plug, centrally secured to the apparatus. Tubes 15 and 16, preferably of brass, fit over conducting rods 8 and 9 to sustain the same.

17 shows a conducting cord for conducting current to the apparatus.

To operate the apparatus the hopper 28 should be removed from the funnel 3 upon which it fits; then the valve 4 should be opened, valve 5 which is to be used for emptying the boiler being closed. The boiler should be filled by pouring water in the funnel 3. When the boiler is filled to the proper height, water will flow out of waste pipe 6 into drip pan 7; then valve 4 should be closed and electric current should be permitted to enter through cord 17. The top plate 20 is removable, screws at each end as shown securing the same, the electrodes being suspended from the said plate as illustrated in Fig. 1 and thereby the electrodes may be removed for cleaning.

I claim:—

1. In an electric water heating apparatus in combination with a boiler, a plurality of electrodes having lower integral concave surfaces spaced therein, and current conducting means leading to said electrodes.

2. In an electric water heating apparatus in combination with a boiler, a plurality of electrodes having lower integral concave surfaces spaced therein, an electrode having a lower flat surface out of contact with said boiler, and current conducting means leading to all of said electrodes.

3. In an electric water heating apparatus the combination of a boiler, a plug over said boiler, an upper electrode having a concave bottom, in said boiler, a lower electrode in said boiler, an insulated conducting rod engaging said electrodes, an intermediate electrode having a concave bottom, an insulated conducting rod engaging said intermediate electrode, a tube penetrating said boiler provided with a funnel and valve for feeding the same and current conducting means leading to said rods.

4. In an electric water heating apparatus in combination with a boiler, a plug over said boiler, a pair of rods in said boiler engaged by said plug, a removable top plate on said boiler penetrated by and secured to said rods, and a plurality of electrodes in said boiler supported by said rods.

In testimony whereof I affix my signature, in presence of two witnesses.

JOHANN G. WALLMANN.

Witnesses:
ALFRED JOHNSON,
S. WACHSMAN.